United States Patent
Otanicar et al.

(10) Patent No.: US 11,338,220 B2
(45) Date of Patent: *May 24, 2022

(54) ATMOSPHERIC WATER GENERATOR APPARATUS

(71) Applicant: Exaeris Water Innovations, LLC, Tulsa, OK (US)

(72) Inventors: Todd Otanicar, Tulsa, OK (US); John Galbraith, Tulsa, OK (US)

(73) Assignee: Exaeris Water Innovations, LLC, Tulsa, OK (US)

(*) Notice: Subject to any disclaimer, the term of this patent is extended or adjusted under 35 U.S.C. 154(b) by 93 days.

This patent is subject to a terminal disclaimer.

(21) Appl. No.: 16/587,269

(22) Filed: Sep. 30, 2019

(65) Prior Publication Data

US 2020/0171407 A1 Jun. 4, 2020

Related U.S. Application Data

(63) Continuation-in-part of application No. 16/371,508, filed on Apr. 1, 2019.

(Continued)

(51) Int. Cl.
*B01D 5/00* (2006.01)
*F24F 3/14* (2006.01)

(52) U.S. Cl.
CPC .......... *B01D 5/0075* (2013.01); *B01D 5/009* (2013.01); *B01D 5/0015* (2013.01); *F24F 3/14* (2013.01); *F24F 2003/1446* (2013.01)

(58) Field of Classification Search
CPC .... F24F 3/14; F24F 3/1405; F24F 2003/1446; F24F 2003/144; F24F 1/0358; F24F 5/0042; B01D 5/0075; B01D 5/0015; B01D 5/009; B01D 5/0003; B01D 5/0006; B01D 5/0009; B01D 5/0012; B01D 5/0042;

(Continued)

(56) References Cited

U.S. PATENT DOCUMENTS 6,245,854 B1 * 6/2001 Obioha ............... C09D 127/12
165/133
6,581,849 B2 6/2003 Zhang
(Continued)

FOREIGN PATENT DOCUMENTS

WO 2009027975 3/2009
WO 2013026126 2/2013

OTHER PUBLICATIONS

KIPO, "International Search Report", dated Mar. 16, 2020, Published in: WO.

*Primary Examiner* — Joseph F Trpisovsky
(74) *Attorney, Agent, or Firm* — Head, Johnson, Kachigian & Wilkinson, PC

(57) ABSTRACT

An atmospheric water generator apparatus. In one embodiment, the apparatus includes a fluid cooling device. A water condensing surface is thermally connected to the fluid cooling device, the water condensing surface having a superhydrophobic condensing surface, a highly hydrophobic condensing surface, a superhydrophilic condensing surface, a highly hydrophilic condensing surface, or a combination thereof. An air-cooled heat rejection device is in fluid communication with a fluid cooling device. An air fan is configured to induce airflow across the water condensing surface in order to condense and extract water from the atmosphere.

7 Claims, 10 Drawing Sheets

Related U.S. Application Data

(60) Provisional application No. 62/774,536, filed on Dec. 3, 2018.

(58) Field of Classification Search
CPC ..... B01D 53/265; B01D 53/002; F25B 17/00; F25B 21/02; F25B 47/006; F25B 2339/022; F25B 2339/023; F25B 2339/0241; F25B 2339/0242; F25B 2339/043; F28F 13/187; F28F 13/185; F28F 13/182; F28F 13/18; F28F 2245/02
See application file for complete search history.

(56) References Cited

U.S. PATENT DOCUMENTS

| | | |
|---|---|---|
| 6,828,499 B2 | 12/2004 | Max |
| 7,272,947 B2 * | 9/2007 | Anderson ............ B01D 5/0039 62/272 |
| 8,448,678 B2 | 5/2013 | Mitchell |
| 9,234,706 B2 * | 1/2016 | Hamada ................. F28F 1/325 |
| 9,534,132 B2 | 1/2017 | Osako et al. |
| 9,556,338 B2 | 1/2017 | Jing et al. |
| 9,587,304 B2 | 3/2017 | Bormashenko et al. |
| 9,675,994 B2 | 6/2017 | Schoenfisch et al. |
| 10,113,777 B2 | 10/2018 | Otanicar et al. |
| 10,150,875 B2 | 12/2018 | Simpson |
| 2007/0261413 A1 | 11/2007 | Hatamian et al. |
| 2011/0048038 A1 | 3/2011 | Merritt et al. |
| 2011/0232305 A1 | 9/2011 | Minhas et al. |
| 2013/0003258 A1 | 1/2013 | Xie et al. |
| 2016/0131401 A1 * | 5/2016 | Otanicar ............... B01D 5/0042 62/3.3 |
| 2016/0145837 A1 | 5/2016 | Abrari |
| 2016/0208461 A1 | 7/2016 | Bahadur et al. |
| 2017/0073539 A1 | 3/2017 | de Zeeuw et al. |
| 2019/0008219 A1 * | 1/2019 | Davidovits ........... F04D 29/282 |

* cited by examiner

ATMOSPHERIC WATER GENERATOR APPARATUS

CROSS-REFERENCE TO RELATED APPLICATION

This application is a continuation-in-part application of U.S. patent application Ser. No. 16/371,508 which is based on and claims priority to U.S. Provisional Patent Application Ser. No. 62/774,536, filed Dec. 3, 2018, which are incorporated herein in its entirety by reference.

BACKGROUND OF THE INVENTION

FEDERALLY SPONSORED RESEARCH OR DEVELOPMENT

Not applicable.

FIELD OF THE INVENTION

The present invention relates to an atmospheric water generator apparatus in order to condense and extract water from the atmosphere. In particular, the present invention is directed to an atmospheric water generator apparatus having a water condensing surface thermally connected to a fluid cooling device for providing water for drinking, irrigation or other purposes.

DESCRIPTION OF THE RELATED ART

Over time, fresh water supplies have diminished while the population continues to grow. Water is an essential element for drinking purposes, for agriculture, and for food production for both humans and animals.

In addition to the increasing need for fresh water, it would be desirable to collect water closer to where the water is needed in order to reduce energy consumption and costs associated with transporting the water.

It would also be desirable to increase the water supply in areas where fresh water is scarce.

There is also a need for a water condensing apparatus providing maximum condensation and extraction of water vapor from ambient air.

Various proposals have been made in the past to generate water from condensation. Castanon Seaone (Pat. Publ. No. WO2013026126) discloses a Peltier device with rigid corrugated condenser plates. A shaker array system removes water condensation.

Max (U.S. Pat. No. 6,828,499) discloses a photovoltaic panel with an energy storage component attached to a cooling panel which can be made of either a miniaturized refrigeration or a Peltier device.

Zhang (U.S. Pat. No. 6,581,849) discloses an automatic flower watering device using a Peltier device connected to a finned condenser and includes an automatic wiper to remove water from a condenser surface.

Hatamian et al. (U.S. Pat. Publ. No. 2007/0261413) discloses a Peltier device for drinking water and includes a filtration system and capillary tubes for filtration and extraction.

In addition, Applicant's prior (U.S. Pat. No. 10,113,777) discloses a Peltier device for ambient water condensing, which is incorporated herein and made a part hereof.

Notwithstanding the foregoing, there remains a need for an economic and efficient atmospheric water condensing apparatus.

In addition, there have been various proposals in the past to alter water condensing surfaces, such as hydrophobic surfaces, superhydrophobic surfaces, hydrophilic surfaces, and superhydrophilic surfaces. Examples include Bormashenko et al. (U.S. Pat. No. 9,587,304), Schoenfisch (U.S. Pat. No. 9,675,994), Simpson (U.S. Pat. No. 10,150,875), Osaka (U.S. Pat. No. 9,534,132), de Zeeuw et al. (U.S. Pat. Publ. No. 2017/0073539), and Jing et al. (U.S. Pat. No. 9,556,338). Notwithstanding the foregoing, there remains a need to optimize the water condensing surface for an atmospheric water generator.

SUMMARY OF THE INVENTION

The present invention is directed to an atmospheric water generator apparatus for condensing and extracting water from the atmosphere.

In one preferred embodiment, the apparatus includes a fluid heating device to heat or warm a refrigerant liquid or gas fluid. The warm refrigerant fluid is passed through an air-cooled heat rejection device which may take the form of fins extending from a tube or tubes. The refrigerant fluid is thereafter directed to a fluid cooling device.

The fluid cooling device is a part of or is in fluid communication with a water condensing surface. The water condensing surface may include a plurality of fins extending from a tube conveying the refrigerant fluid therethrough. Alternatively, the water condensing surface may include a plate in communication with a tube or tubes conveying the refrigerant liquid therethrough. Ambient air is forced over the fins or the plate by forced air from a fan, resulting in water condensation.

The refrigerant fluid thereafter is cycled back to the fluid heating device and the process continues in a continuous loop.

The fins or the plate of the water condensing surface may comprise a superhydrophobic condensing surface, a highly hydrophobic condensing surface, a superhydrophilic condensing surface, a highly hydrophilic condensing surface, or a combination thereof.

DETAILED DESCRIPTION OF THE INVENTION

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

Figure 1:
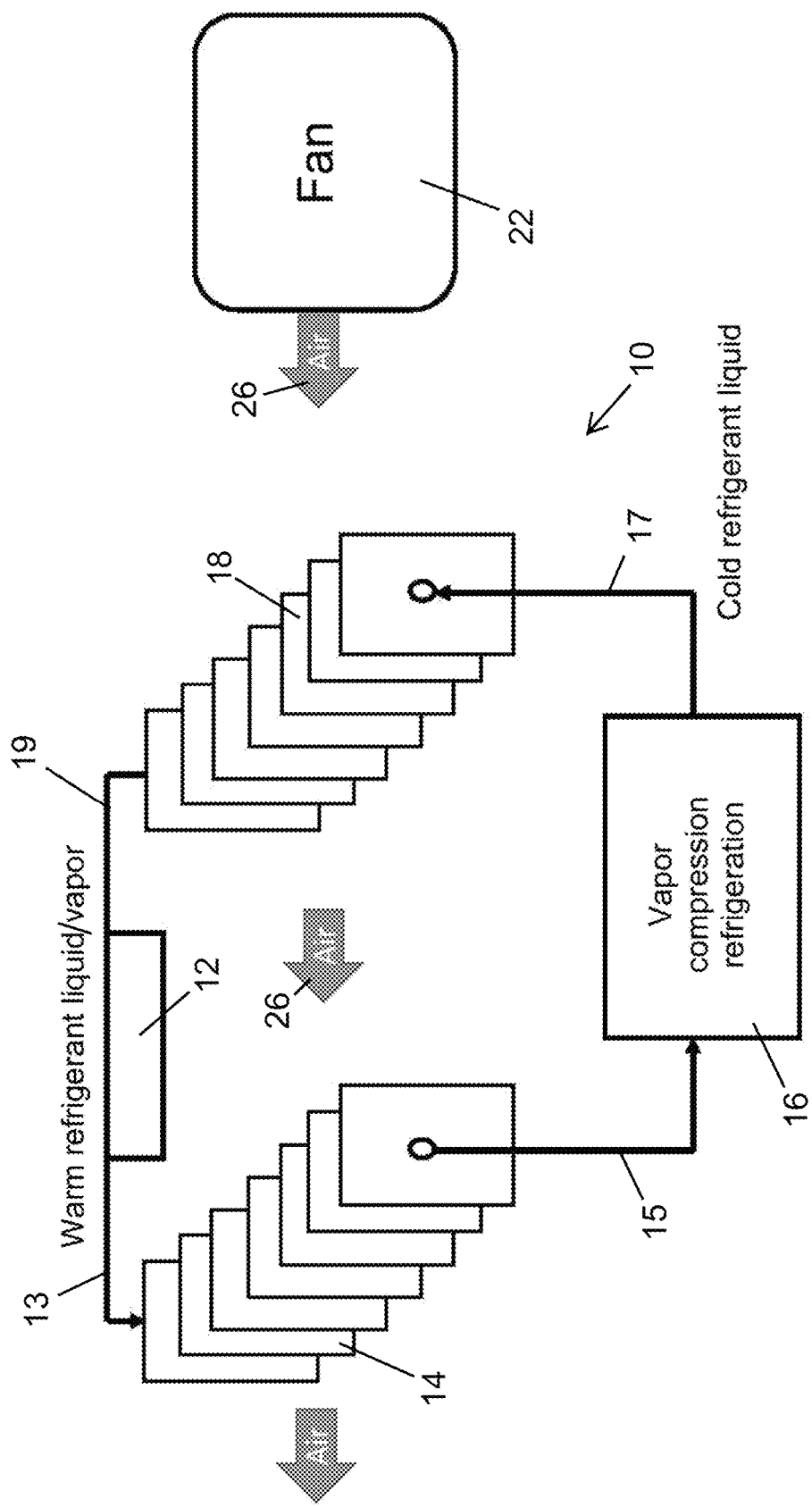
FIGS. 1 and 2 illustrate schematic diagrams of a first preferred embodiment of an atmospheric water generator apparatus constructed in accordance with the present invention.
Figure 2:
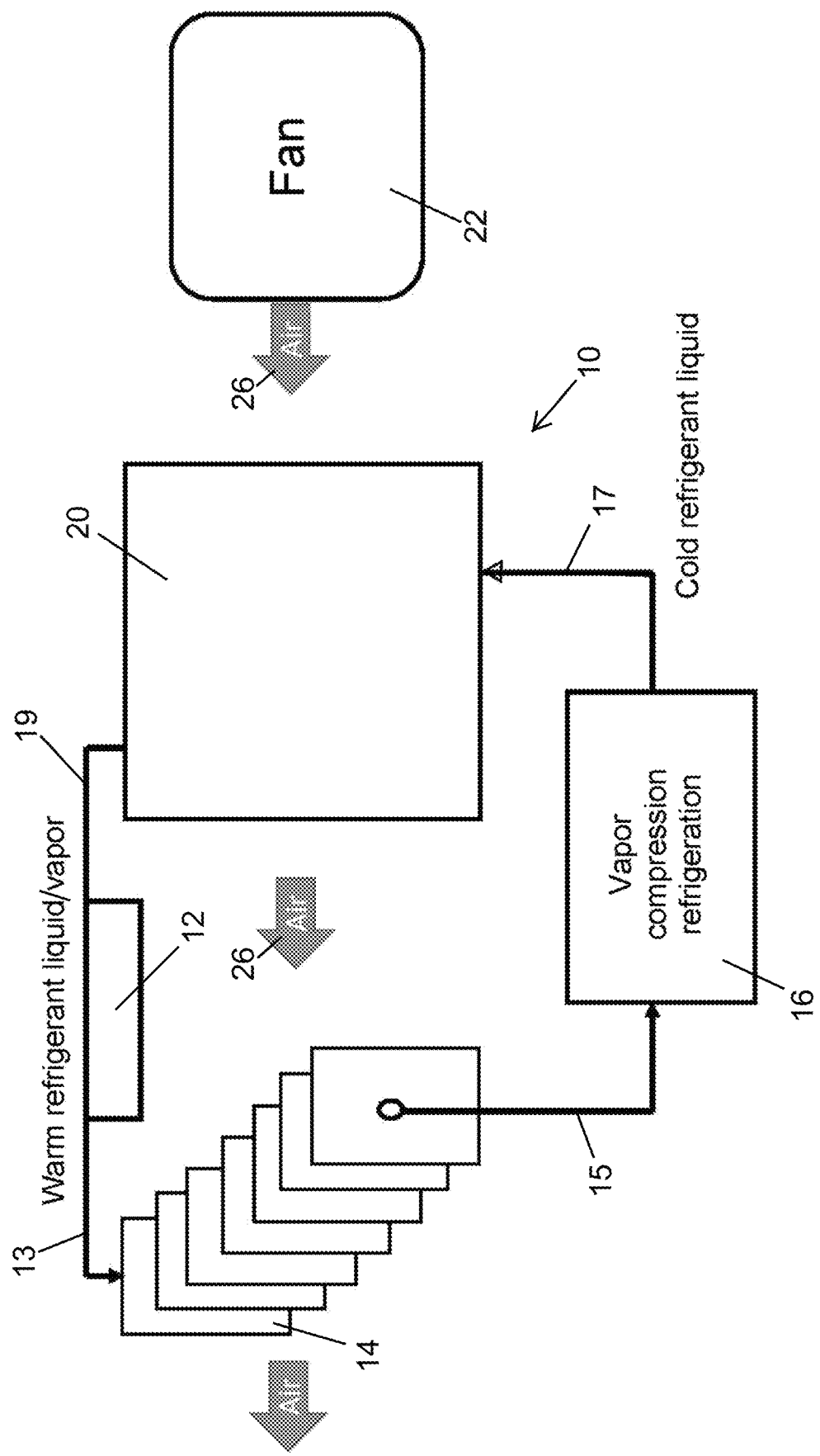

Referring to the drawings in detail, FIGS. 1 and 2 illustrate simplified schematic diagrams of a first preferred embodiment 10 of the apparatus of the present invention utilizing vapor compression. A fluid heating device 12 is utilized to heat or warm a refrigerant liquid or gas fluid. Non-limiting examples of a fluid refrigerant are R-134A, R-22, R-410A, HFE-7100, and R-600.

One example of the fluid heating device 12 would be a compressor which raises both the temperature and pressure of the refrigerant fluid. Electric or other power (not shown) may be used to power the compressor.

The warm refrigerant fluid is passed via a line 13 to and through an air-cooled heat rejection device 14 which may take the form of fins extending from a tube or tubes. Heat will be rejected to ambient air or to ambient air cooled by a fan 22. The refrigerant fluid is thereafter directed via a line 15 to a fluid cooling device 16, such as a vapor compression refrigerator, including a throttle.

The fluid cooling device 16 is a part of or is in fluid communication via a line 17 with a water condensing surface. In the embodiment shown in FIG. 1, the water condensing surface includes a plurality of fins 18 that may extend from a tube or tubes conveying the refrigerant fluid therethrough. Ambient air is forced over the fins by force of air from the fan 22, as illustrated by arrows 26, resulting in water condensation.

In the embodiment shown in FIG. 2 utilizing vapor compression, the water condensing surface may be in the form of a plate 20 in communication with a tube or tubes conveying the refrigerant fluid therein. Ambient air is forced over the plate by force of air from the fan 22, resulting in water condensation.

The refrigerant fluid thereafter is cycled back to the fluid heating device 12 via a line 19 and the process proceeds in a continuous loop.

The heat in the process may drive the refrigerant fluid through the system or, alternatively, an optional pump (not shown) may be employed.

The water condensing surface of either the fins 18 or the plate 20 may include a metallic base material and a coating or coatings and may comprise a hydrophobic condensing surface, a hydrophilic condensing surface, or a combination thereof. It has been found that superhydrophobic surfaces having a contact angle greater than 150 degrees and highly hydrophobic surfaces having a contact angle between 110 and 150 degrees are preferred.

A hydrophobic condensing surface enhances the ability of the apparatus 10 to capture water from ambient air. Additionally, the hydrophobic surface enhances drainage of condensed water in the condensing surface.

The hydrophobic condensing surface may include nanopatterned surfaces created through chemical etching. In addition, the hydrophobic condensing surfaces may include nanoroughened surfaces created through chemical etching. Additionally, the hydrophobic condensing surface may include nanostructured surfaces created through deposition of nanoscale structures.

Hydrophobic surfaces can be applied via a variety of different techniques: spray coating with a high velocity low pressure jet, dip coating, and dip coating with sonication. One coating is a nano-scale organometallic coating capable of adhesion to most surfaces made of solids suspended in an isopropanol solvent. The coating can be applied such that the thickness is controlled from 5-100 nm. The coating results in a structured surface with extremely small surface features on the order of nanometers.

Another approach is to create a hydrophobic powder derived from diatomaceous earth (DE), which is porous, by coating the DE with a hydrophobic layer that is preferably a self-assembled monolayer. The powder can then be applied to the surface by placing the DE powder in a suspension and then coating on the surface using a suitable binder (such as polysytene or polyacrylate) for adhesion to nearby particles and the surface. Depending on the base particle, thickness of application, mass fraction of particles in suspension, and processing conditions the contact angle and wettability can be controlled.

The use of a hydrophilic condensing surface results in increased condensate formation. It has been found that superhydrophilic surfaces having a contact angle of less than 10 degrees and highly hydrophilic surfaces having a contact angle of between 10 and 50 degrees are preferred.

Hydrophilic (and superhydrophilic) surfaces can be prepared in a variety of methods. One common approach is to treat a polymer with plasma, either microwave or low-pressure plasmas. In the presence of different gases, the chemical properties and wettability of the base polymer is changed. Another approach is to create hydrophilic particles in size ranges from 1 nm to 20 microns with a BET surface are of 50-600 $m^2/g$. One particle class is the hydrophobic silicas. The particles are then suspended in a suitable solvent that can then be applied to a surface, typically a mixture of alcohols as the book solvent with dissolved polymer for adhesion. Depending on the base particle, thickness of application, mass fraction of particles in suspension, and processing conditions the contact angle and wettability can be controlled.

Figure 3:
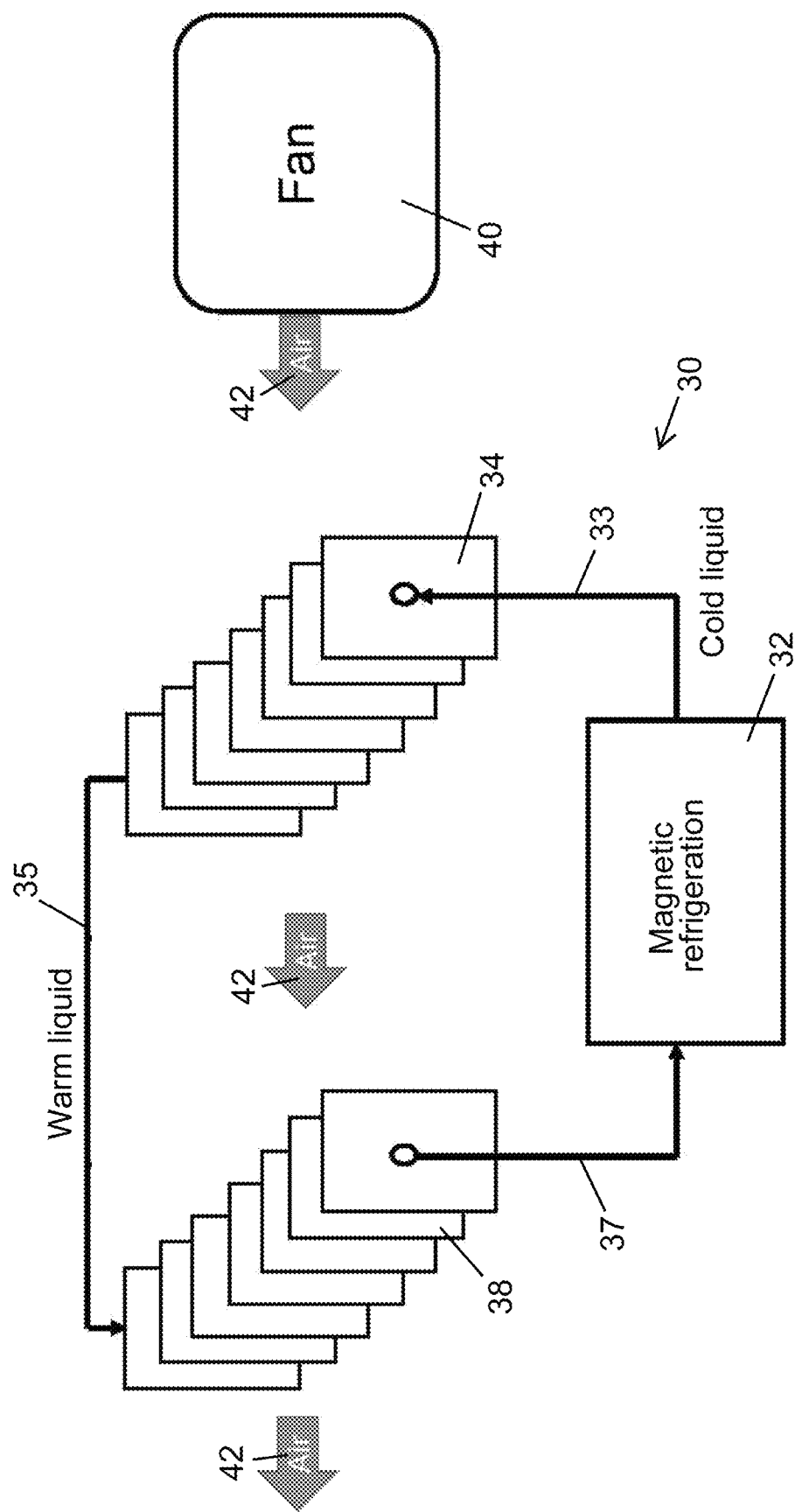
FIGS. 3 and 4 illustrate schematic diagrams of a second preferred embodiment of the present invention.
Figure 4:
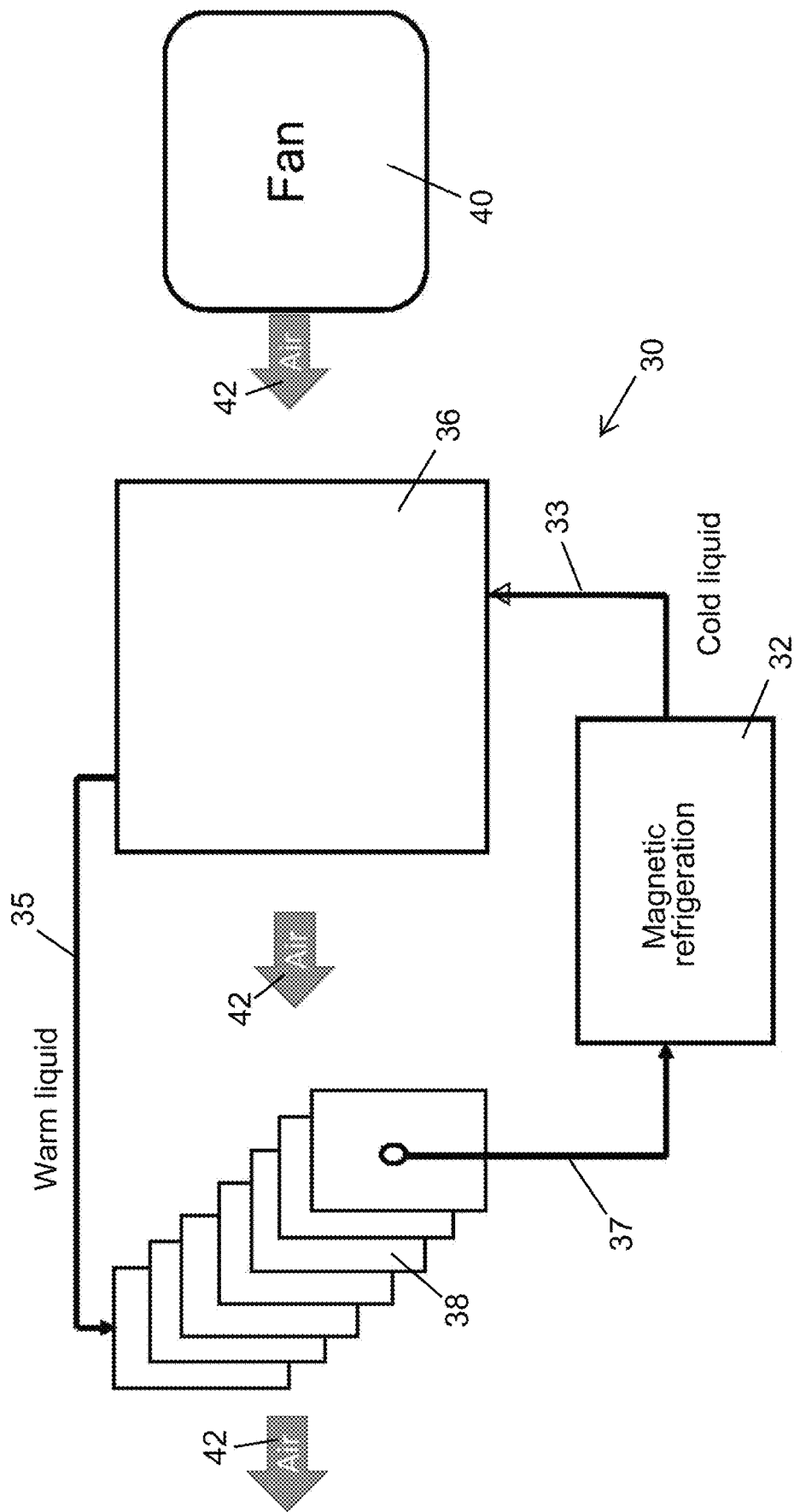

FIGS. 3 and 4 illustrate a second preferred embodiment 30 of the apparatus of the present invention to condense and extract water employing magnetic refrigeration. A fluid cooling device 32 is in the form of a magnetic refrigerator. The magnetic refrigerator utilizes the magnetocaloric effect wherein temperature changes are induced through exposing materials to a changing magnetic field. Material would be magnetized, at which point heat is removed through a fluid refrigerant flowing through the materials.

Fluid refrigerant is thereafter passed via a line 33 to a water condensing surface. Non-limiting examples of fluid refrigerants would be water, water-glycol mixtures, and glycol.

The water condensing surface in the embodiment in FIG. 3 is in the form of a tube or a series of tubes having fins 34 extending from the tube or tubes conveying the refrigerant fluid therethrough. In the embodiment shown in FIG. 4, the water condensing surface may be in the form of a plate 36 in communication with a tube or tubes conveying the refrigerant fluid therein. In each case, ambient air is forced over the fins or the plate by forced air from a fan 40, as illustrated by arrows 42, resulting in water condensation.

The water condensing surface of the fins or the plate may include a metallic base material and a coating or coatings and may comprise a hydrophobic condensing surface, a hydrophilic condensing surface, or a combination thereof. It has been found that superhydrophobic surfaces having a contact angle greater than 150 degrees and highly hydrophobic surfaces having a contact angle between 110 and 150 degrees are preferred.

The hydrophobic condensing surface enhances the ability of the apparatus 30 to capture water from ambient air.

Additionally, the hydrophobic surface enhances drainage of condensed water in the condensing surface.

The use of a hydrophilic condensing surface results in increased condensate formation. It has been found that superhydrophilic surfaces having a contact angle of less than 10 degrees and highly hydrophilic surfaces having a contact angle of between 10 and 50 degrees are preferred.

The refrigerant fluid thereafter cycles back via a line 35. The refrigerant fluid may be warmed by ambient air or by another mechanism. The refrigerant fluid passes through an air-cooled heat rejection device 38 which may take the form of fins extending from a tube or tubes. Heat will be rejected to ambient air or to ambient air cooled by a fan 22. The refrigerant fluid is thereafter directed back to the magnetic refrigerator 32 via a line 37 and the process proceeds in a continuous loop.

The heat in the process may drive the refrigerant fluid through the system or, alternatively, an optional pump (not shown) may be employed.

Figure 5:
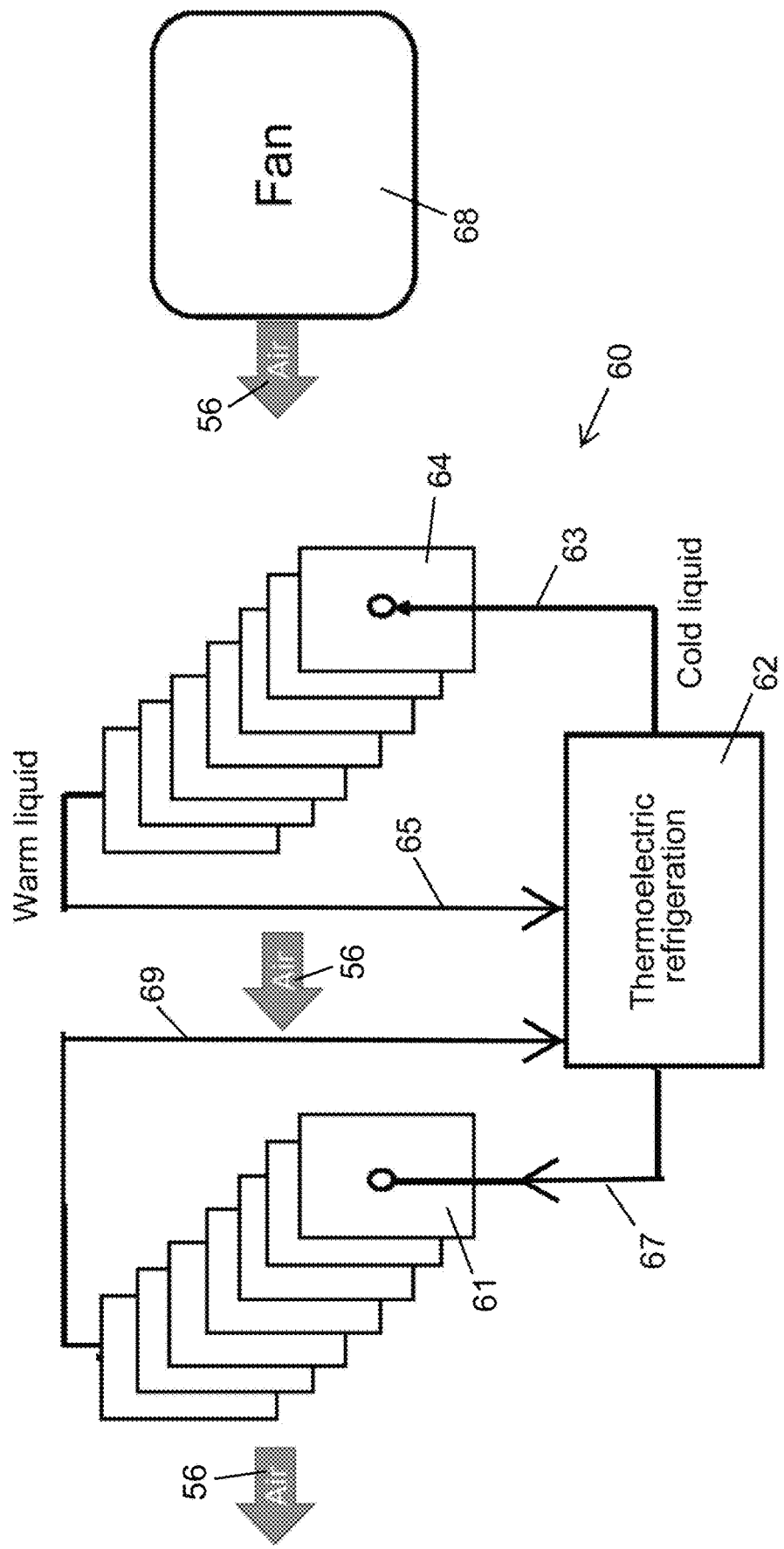
FIGS. 5 and 6 illustrate schematic diagrams of a third preferred embodiment of the present invention.
Figure 6:
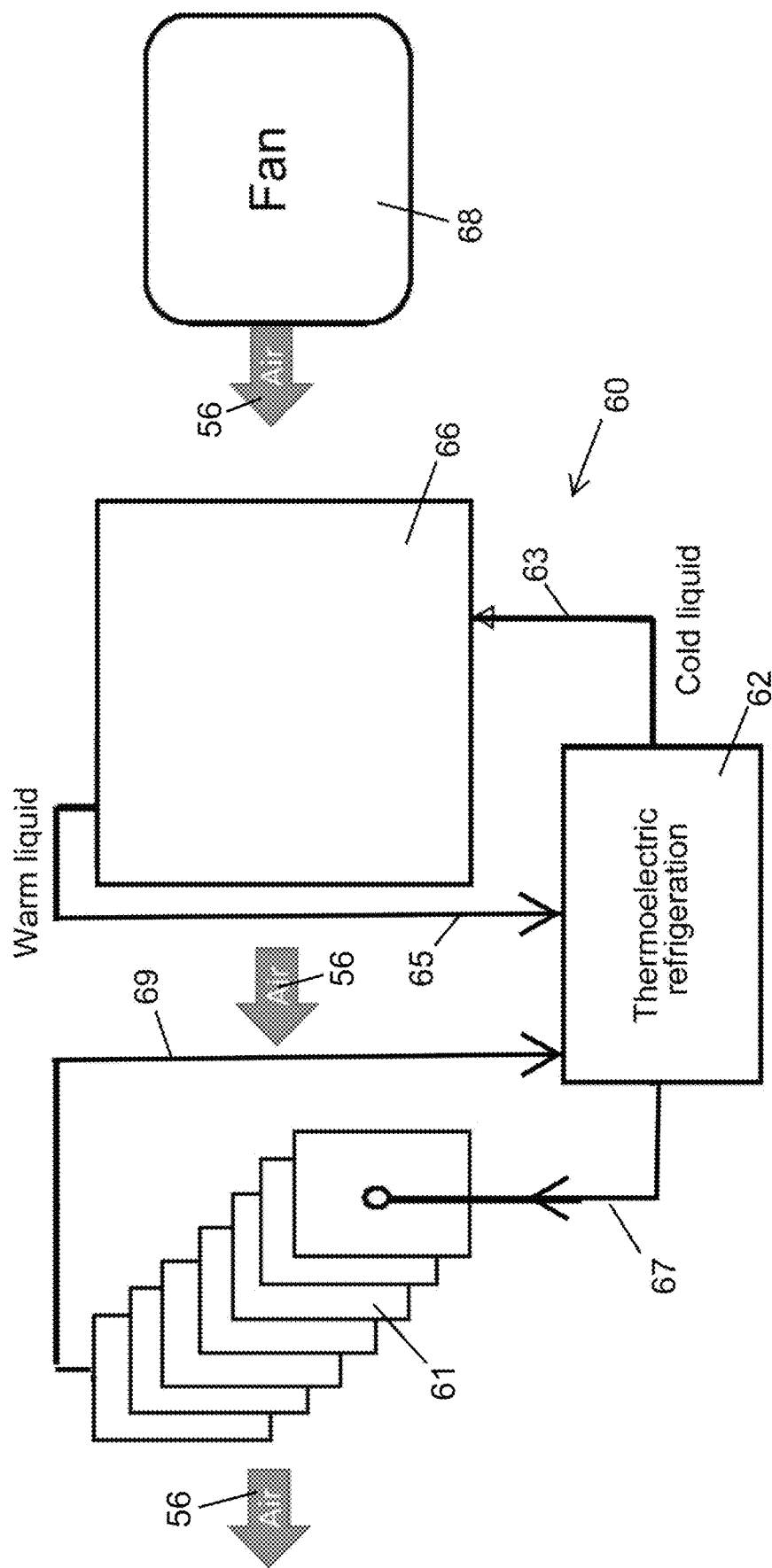

FIGS. 5 and 6 illustrate a third preferred embodiment 60 of the apparatus of the present invention to condense and extract water employing absorption refrigeration. A fluid heating device and a fluid refrigeration device in the form of a thermoelectric device 62 is utilized. A fluid refrigerant is cooled and then passed via a line 63 to a water condensing surface.

In the FIG. 5 embodiment, the water condensing surface is a series of fins 64 that may extend from a tube or tubes conveying the refrigerant fluid therethrough.

In the embodiment shown in FIG. 6, the water condensing surface may be in the form of a plate 66 in communication with the tube or tubes having refrigerant fluid conveyed therein. In each case, ambient air is forced over the fins or the plate by forced air from a fan 68, as shown by arrows 56, resulting in water condensation.

Thereafter the refrigerant fluid is cycled back to the thermoelectric refrigerator via a line 65 where the refrigerant fluid is heated. The warm refrigerant fluid is then passed via a line 67 to and through a heat rejection device 61 which may be in the form of a plurality of fins extending from the tube or tubes containing the refrigerant fluid. The refrigerant fluid is thereafter directed back to the thermoelectric device 62 via a line 69 and the process proceeds in a continuous loop.

The water condensing surface of either the fins 64 or the plate 66 may include a metallic base material and a coating or coatings and may comprise a hydrophobic condensing surface, a hydrophilic condensing surface, or a combination thereof. It has been found that superhydrophobic surfaces having a contact angle greater than 150 degrees and highly hydrophobic surfaces having a contact angle between 110 and 150 degrees are preferred.

The hydrophobic condensing surface enhances the ability of the apparatus 60 to capture water from ambient air. Additionally, the hydrophobic surface enhances drainage of condensed water in the condensing surface.

The use of a hydrophilic condensing surface results in increased condensate formation. It has been found that superhydrophilic surfaces having a contact angle of less than 10 degrees and highly hydrophilic surfaces having a contact angle between 10 and 50 degrees are preferred.

Figure 7:
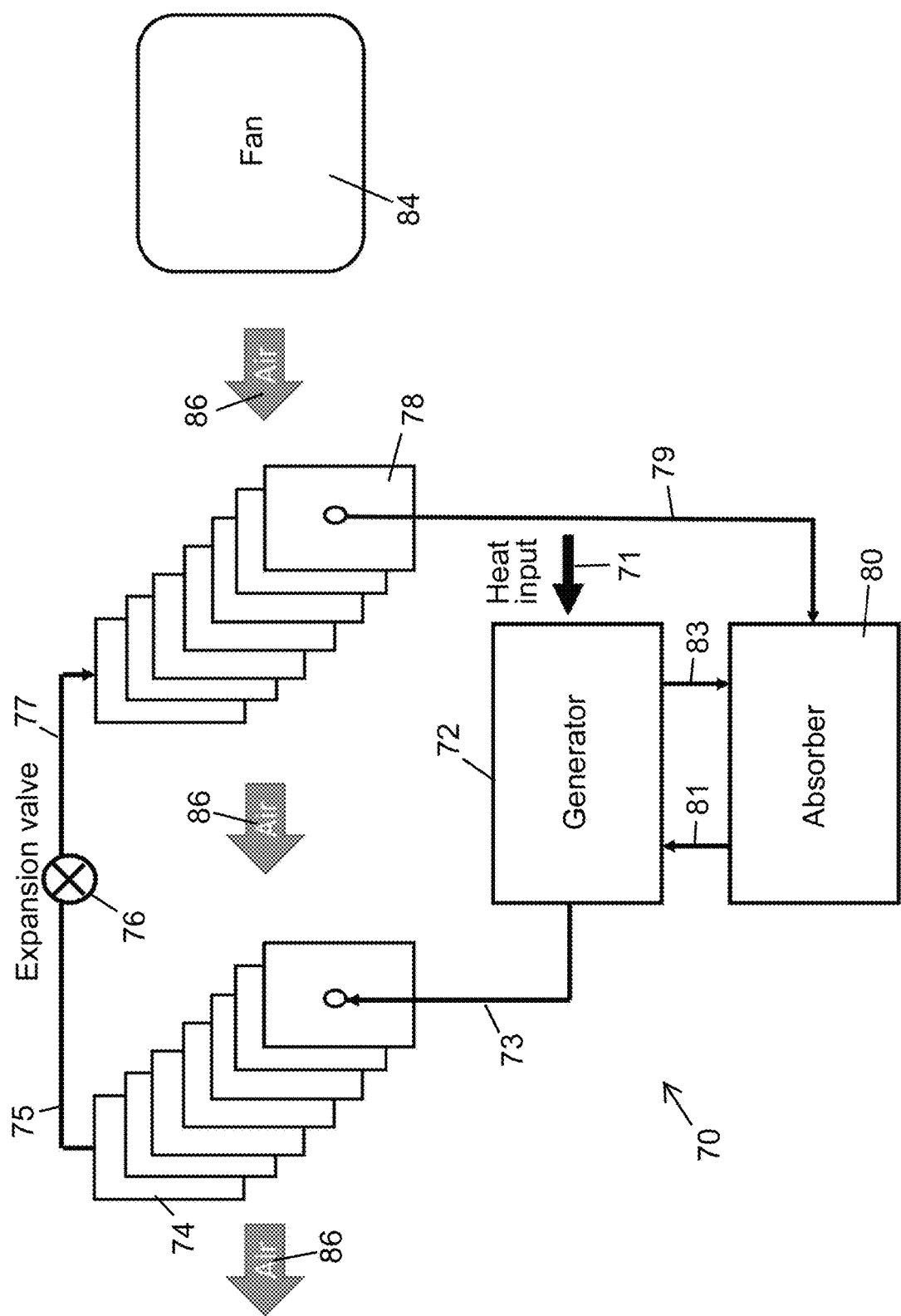
FIGS. 7 and 8 illustrate schematic diagrams of a fourth preferred embodiment of the present invention.
Figure 8:
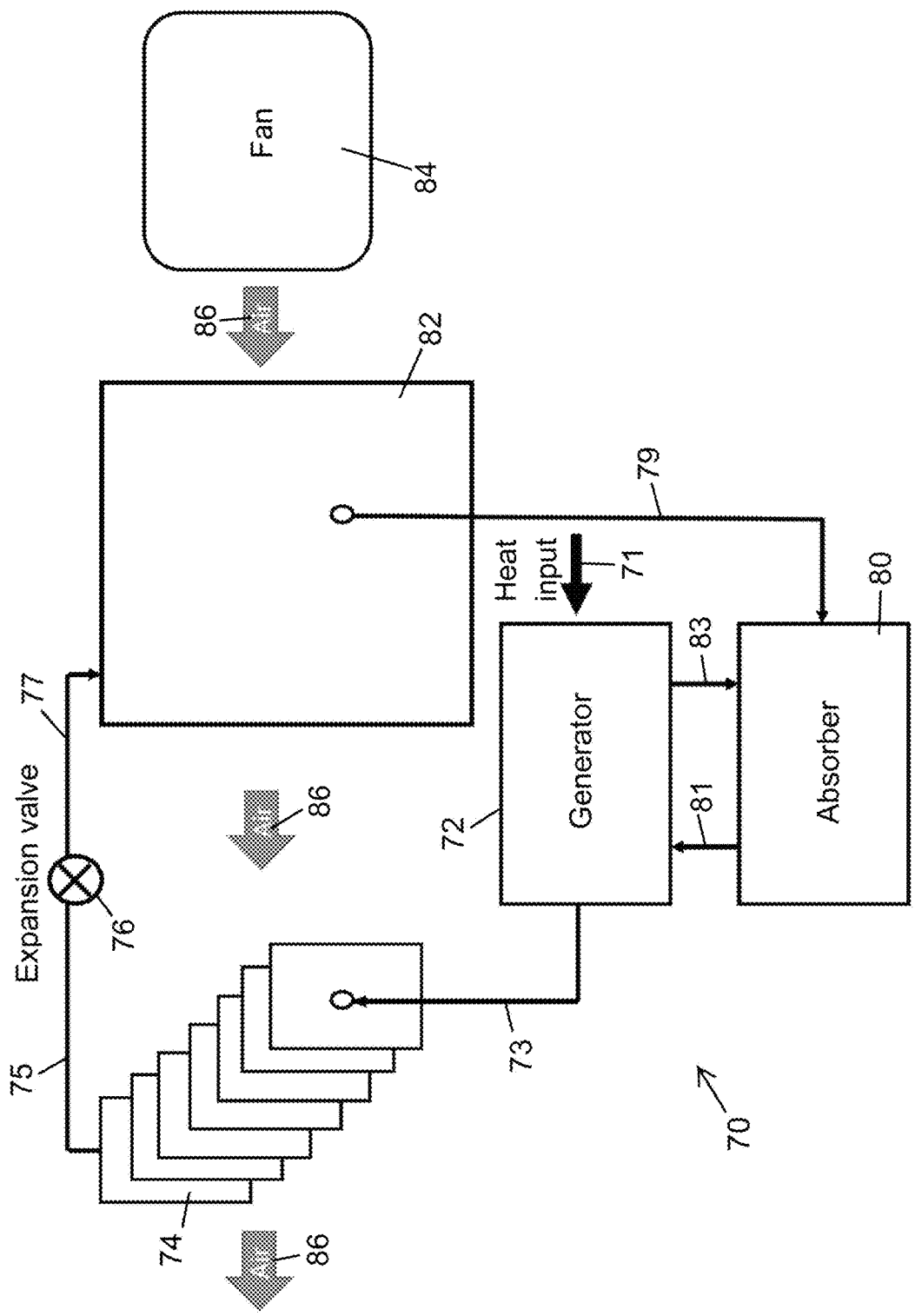

FIGS. 7 and 8 illustrate simplified schematic diagrams of a fourth preferred embodiment 70 of the apparatus of the present invention to condense and extract water. Absorption refrigeration is employed in a heat driven refrigeration cycle utilizing a two-part fluid made up of an absorbent-refrigerant pair. Non-limiting examples include ammonia and water, ammonia and lithium nitrate, water and lithium bromide, water and lithium chloride, water and lithium bromide plus sodium formate. In a generator 72, heat is applied via an electric heater, gas flame, waste heat source, or other form of heat as shown by arrow 71 in order to drive the refrigerant from the fluid solution. From there, the refrigerant flows via a line 73 to and through a condenser 74 where it gives up heat to the surroundings and a refrigerant vapor condenses into a lower temperature liquid. In the embodiment shown, the condenser 74 includes a plurality of fins. From there, the refrigerant is directed via a line 75 to and through a throttling process where the pressure is rapidly dropped and colder refrigerant is created, as shown at expansion valve 76.

Separately, the absorbent is returned to an absorber 80 via a line 83.

The refrigerant thereafter flows via a line 77 to and through an evaporator of the cycle as the cold liquid refrigerant becomes all vapor and delivers cooling. The evaporator in the embodiment shown in FIG. 7 includes a plurality of extending fins 78. In the embodiment shown in FIG. 8, the evaporator includes a plate 82 in communication with a tube or tubes. A flat plate 82 of FIG. 8 or as a series of finned surfaces 78 of FIG. 7 would be treated for special wettability. This treatment would render the surface with either hydrophilic or hydrophobic surface properties or some combination therein as set forth in detail with respect to the previous embodiments.

At this point the refrigerant vapor is mixed with the absorbent in the absorber (80) (where heat must be removed) to restart the cycle. In this system, the airflow provided by a fan (84) or through natural convection would flow over the "evaporator" of the refrigeration cycle causing condensation on the fins or plate. This air would be cooled and could be used on the "condenser" of the refrigeration cycle In each case, airflow is provided by a fan 84 or through natural convection flowing over the evaporator, as shown by arrows 86, causing condensation on the fins or plate.

Finally, the refrigerant vapor is directed via line 79 back to the absorber 80 containing absorbent (where heat is removed) to restart the cycle in the generator, as shown by line 81.

Figure 9:
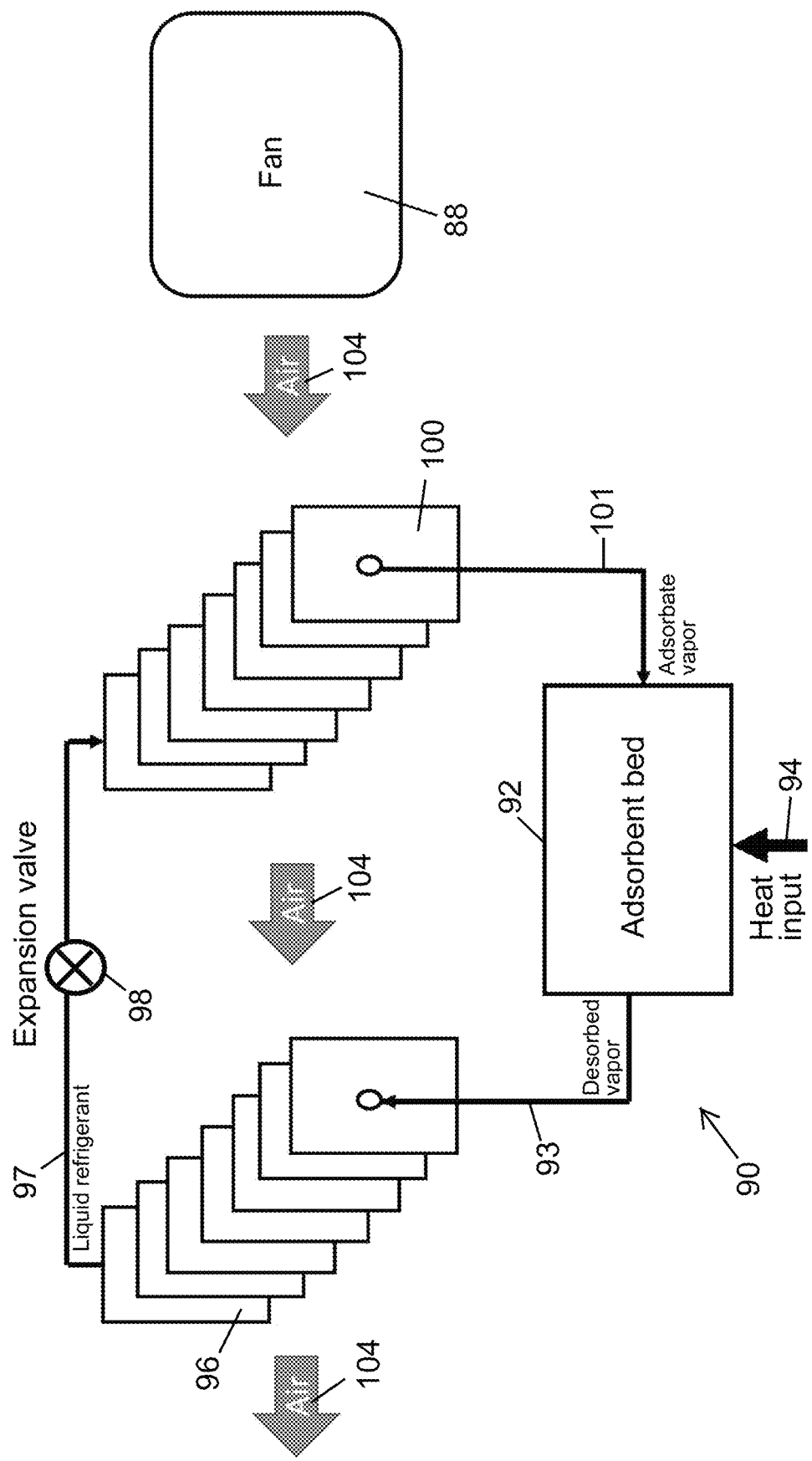
FIGS. 9 and 10 illustrate schematic diagrams of a fifth preferred embodiment of the present invention.
Figure 10:
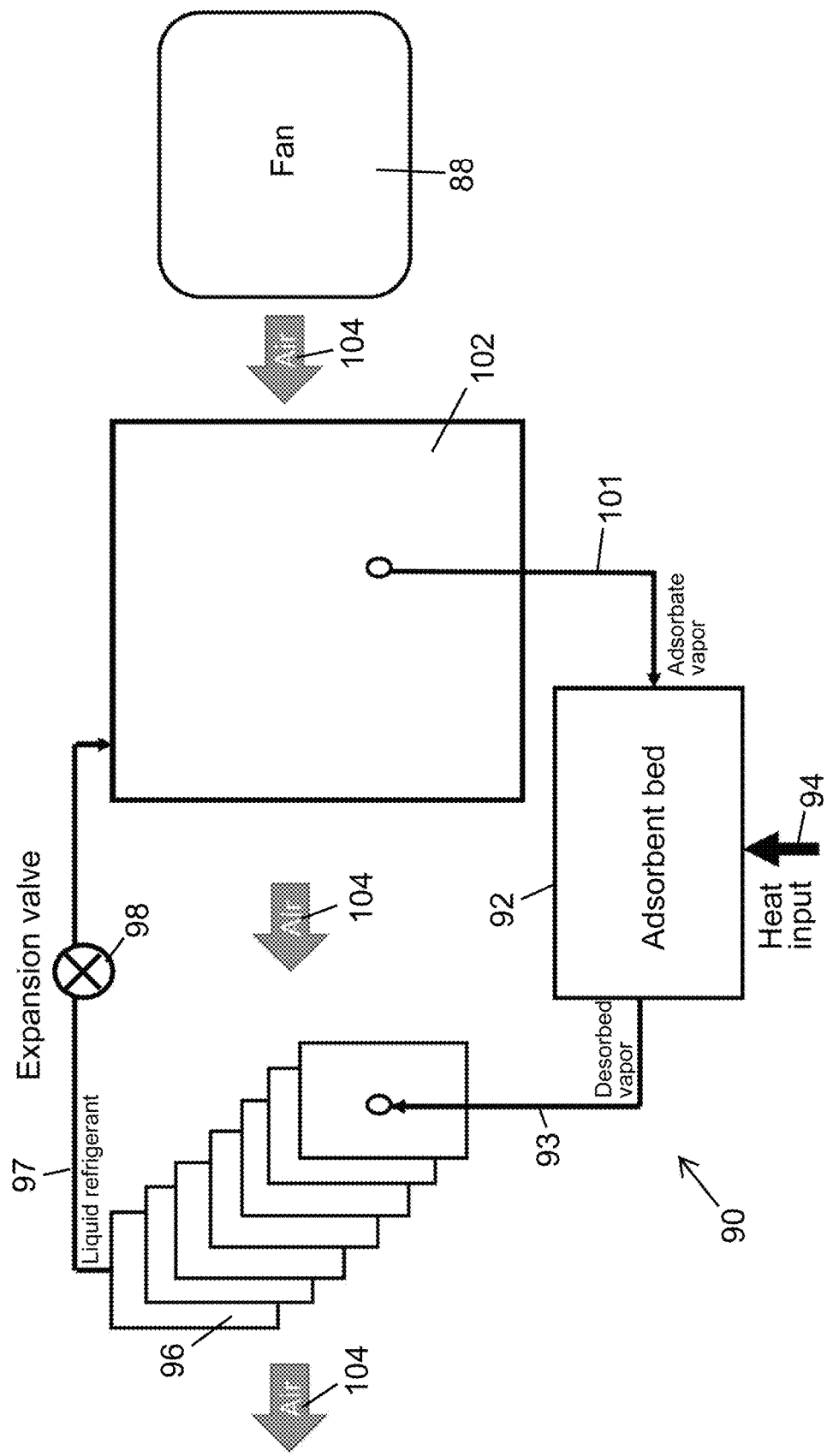

FIGS. 9 and 10 illustrate simplified schematic diagrams of a fifth preferred embodiment 90 of the apparatus of the present invention to condense or extract water. Adsorption refrigeration is utilized with a heat driven refrigeration cycle similar in nature to an absorbent refrigeration cycle except that instead of a two-part fluid, a single refrigerant fluid adsorbs and desorbs onto a surface of a solid. Non-limiting examples of a refrigerant fluid are water, ammonia, and methanol.

In an adsorbent bed 92, heat is applied via an electric heater, gas flame, waste heat source, or other form of heat, as shown by arrow 94, to drive refrigerant (such as water) from the solid sorbent (such as zeolite, carbon, or metal organic framework). From there, refrigerant vapor flows via a line 93 to a condenser 96. Air is directed past the condenser 96 where the refrigerant gives up heat to the surroundings and the refrigerant vapor condenses into a lower temperature liquid. The condenser may include fins extending from a tube or tubes. The refrigerant is thereafter directed via line 97 through a throttling process which includes an expansion valve 98 where the pressure is rapidly dropped and cold refrigerant is created.

Thereafter, the refrigerant flows through an evaporator of the cycle as the cold liquid refrigerant becomes all vapor and delivers cooling. The evaporator of the refrigeration cycle would include a condensing surface for atmospheric water generation. In the embodiment shown in FIG. 9, the evaporator includes extending fins 100 attached to a tube conveying the cold liquid. In the embodiment shown in FIG. 10, the evaporator includes a plate 102 attached to a tube conveying cold liquid. In each case, airflow is provided by a fan 88 or through natural convection, as shown by arrows 104, causing condensation on the fins or plates.

The refrigerant vapor is thereafter directed via a line 101 back to the adsorbent bed 92 to restart the cycle.

A flat plate 102 of FIG. 10 or as a series of finned surfaces 100 of FIG. 9 would be treated for special wettability. This treatment would render the surface with either hydrophilic or hydrophobic surface properties or some combination therein.

The refrigerant vapor is adsorbed onto the solid material to restart the cycle.

The water condensing surface of either the fins or the plate may include a metallic base material and a coating or coatings and may comprise a hydrophobic condensing surface, a hydrophilic condensing surface, or a combination thereof. It has been found that superhydrophobic surfaces having a contact angle greater than 150 degrees and highly hydrophobic surfaces having a contact angle between 110 and 150 degrees are preferred.

The hydrophobic condensing surface enhances the ability of the apparatus 60 to capture water from ambient air. Additionally, the hydrophobic surface enhances drainage of condensed water in the condensing surface.

The hydrophobic condensing surface may include nanopatterned surfaces created through chemical etching. In addition, the hydrophobic condensing surfaces may include nanoroughened surfaces created through chemical etching. Additionally, the hydrophobic condensing surface may include nanostructured surfaces created through deposition of nanoscale structures.

The use of a hydrophilic condensing surface results in increased condensate formation. It has been found that superhydrophilic surfaces having a contact angle of less than 10 degrees and highly hydrophilic surfaces having a contact angle between 10 and 50 degrees are preferred.

Whereas, the invention has been described in relation to the drawings attached hereto, it should be understood that other and further modifications, apart from those shown or suggested herein, may be made within the scope of this invention.

What is claimed is:

1. An atmospheric water generator apparatus, which comprises:
   a fluid heating device;
   a fluid cooling device, wherein said fluid cooling device is a vapor compression refrigerator;
   means to enhance water capture from ambient air comprising a water condensing surface thermally connected to said fluid cooling device, said water condensing surface including a plurality of protruding fin-like surfaces protruding from a tube, said water condensing surface comprising a superhydrophobic coating on the water condensing surface, said superhydrophobic coating comprising a superhydrophobic surface having a contact angle greater than 150 degrees, a superhydrophilic coating on the water condensing surface said syperhydrophilic coating comprising a superhydrophilic surface having a contact angle less than 10 degrees, or a combination thereof;
   an air-cooled heat rejection device in fluid communication with said fluid heating device; and
   an air fan configured to induce airflow across said water condensing surface.

2. The atmospheric water generator apparatus as set forth in claim 1 wherein said air-cooled heat rejection device includes at least one plate.

3. The atmospheric water generator apparatus as set forth in claim 1 wherein said air-cooled heat rejection device includes a plurality of fins.

4. The atmospheric water generator apparatus as set forth in claim 1 wherein said air fan is configured to induce airflow across said heat rejection device.

5. The atmospheric water generator apparatus as set forth in claim 1 wherein cold refrigerant fluid is moved from said vapor compression refrigerator past said water condensing surface, through said fluid heating device, through said heat rejection device, and back to said vapor compression refrigerator.

6. The atmospheric water generator apparatus as set forth in claim 1 wherein said superhydrophobic coating on the water condensing surface comprises nanostructured surfaces of deposited nanoscale structures.

7. The atmospheric water generator apparatus as set forth in claim 1 wherein said water condensing surface includes at least one plate.

\* \* \* \* \*